June 21, 1955 S. W. LEWINTER 2,711,479

VIDEO MAPPING SYSTEM

Filed Aug. 30, 1950 3 Sheets-Sheet 1

INVENTOR.
SIDNEY W. LEWINTER
BY Allen V. Hazeltine
ATTORNEY

June 21, 1955 S. W. LEWINTER 2,711,479

VIDEO MAPPING SYSTEM

Filed Aug. 30, 1950 3 Sheets-Sheet 2

INVENTOR.
SIDNEY W. LEWINTER
BY
Allen V. Hazeltine
ATTORNEY

June 21, 1955 S. W. LEWINTER 2,711,479

VIDEO MAPPING SYSTEM

Filed Aug. 30, 1950 3 Sheets-Sheet 3

INVENTOR.
SIDNEY W. LEWINTER
BY
[signature]
ATTORNEY

United States Patent Office 2,711,479

Patented June 21, 1955

2,711,479

VIDEO MAPPING SYSTEM

Sidney W. Lewinter, Fairlawn, N. J., assignor to Philco Corporation, Philadelphia, Pa., a corporation of Pennsylvania Application August 30, 1950, Serial No. 182,214

4 Claims. (Cl. 250—217)

Figure 1:
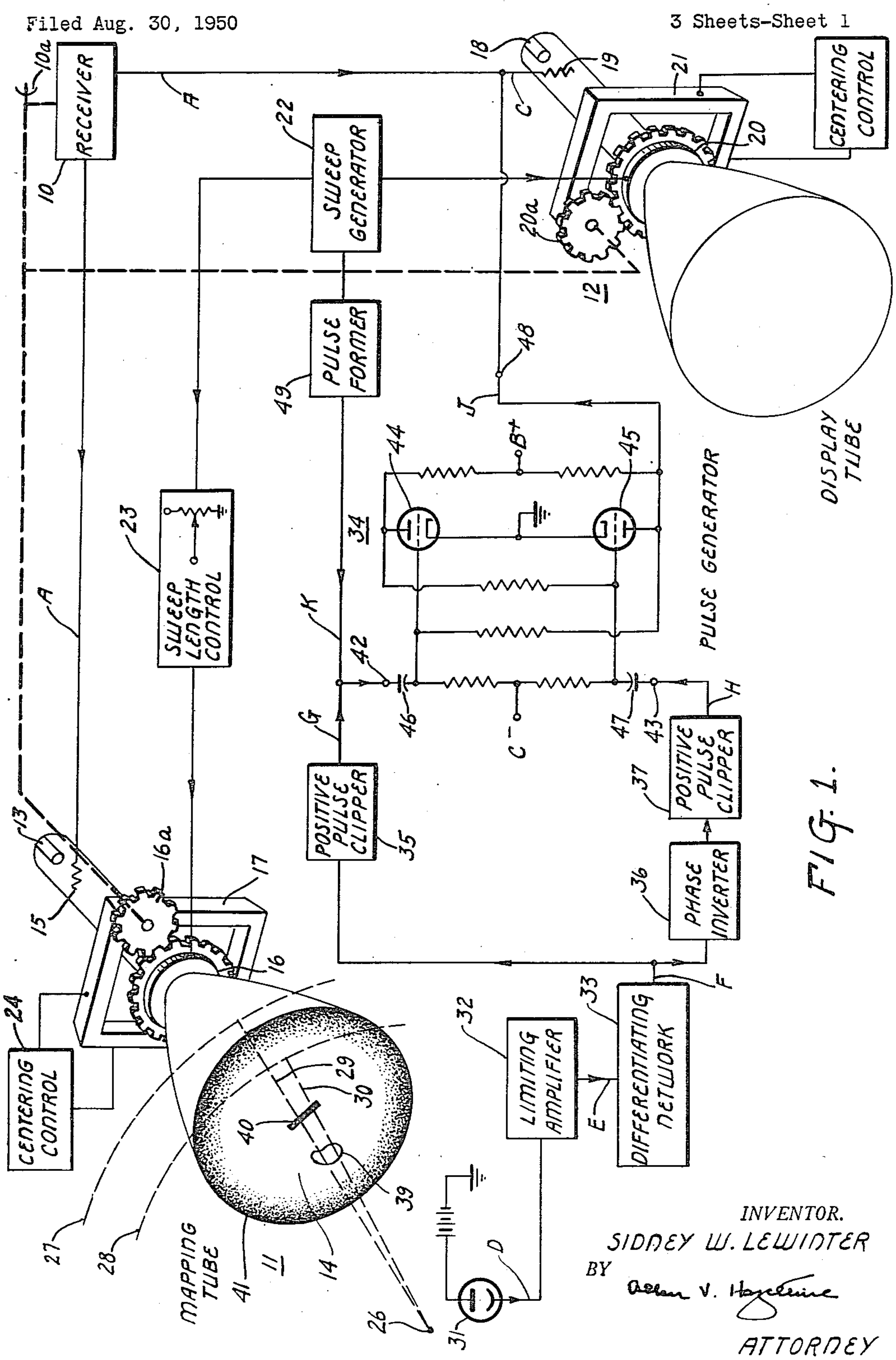

The present invention relates broadly to data presentation on cathode ray tube screens and, more particularly, to a radar data presentation technique known in the art as video mapping.

The term "video mapping" is used in the radar art to designate the process whereby markings made on the face of one cathode ray tube, called the mapping tube, are reproduced on the screen of another distantly located cathode ray tube, called the receiving tube, this reproduction being effected preferably by all-electronic means and without the intervention of any mechanical agencies. Such a technique, evidently, is of wide applicability in the reproduction of indications such as locations of targets, routes of attack, reference numerals, weather information, and the like.

In general, the technique of video mapping has been practiced, heretofore, in the following manner: The indications which were to be reproduced were made on the face of the mapping tube by opaque markings made in any suitable manner. The face of the mapping tube was then scanned by its electron beam in synchronism with the scanning of the face of the display tube by the electron beam of the latter. When the mapping tube beam swept by one of the markings on the face thereof, the light emitted by the tube face in response to excitation by the electron beam was intercepted by the opaque marking with the result that the light emitted by the tube decreased during the time that the beam swept across the opaquely marked tube area. This decrease in light emission was sensed by a photoelectric cell disposed confronting the tube face which emitted a signal pulse whose duration was proportional to the width of the opaque marking measured in the direction of travel of the electron beam. The pulse thus generated by the photoelectric cell in response to the opaque marking on the tube face was then added to the video signals which compose the ordinary radar signal and was thus supplied to the display tube where it controlled the intensity of the display tube electron beam which, as hereinbefore stated, scanned the display tube face synchronously with the scanning of the mapping tube face and thus produced a bright marking in a position on the display tube face which corresponded to that of the opaque marking on the mapping tube face. It is clear that, provided the hereinbefore specified scanning synchronism between the mapping tube and the display tube was maintained, markings placed on the mapping tube face were always reproduced on the display tube face in their proper relative positions, irrespective of any deformation or distortion which might have been imparted to the mapping tube sweep.

One type of deformation which is often intentionally imparted to the sweep, is to lengthen it. In a tube which is used as a convenional plan position indicator, having a radial sweep which varies in azimuth about the center of the tube face as an axis, such lengthening of the sweep results in effective enlargement of that section of the sweep which remains bounded by the tube face. Again with plan position indicators, it is possible to lengthen the sweep and, at the same time, actually move the center of the sweep off the tube face, so that the presentation appearing on the tube face represents a considerably magnified portion of the original complete presentation. This enlarged portion may then be marked with considerably more precision than if the original complete sweep presentation were to appear on the same tube face. Furthermore, a relatively small cathode ray tube may be used as the mapping tube, various portions of the entire sweep being brought onto its screen as interest shifts from one location to another.

It is clear that, when the sweep is thus lengthened and off-centered, the beam will be off the face of the tube during the initial period of each radial sweep. During this period, the illumination of the tube face will be low or zero. The photoelectric cell will respond to this lack of illumination and emit a pulse equal in length to the time it takes the beam to reach the edge of the tube face, the pulse thus produced being similar in every respect to one caused by an opaque marking of corresponding length on the tube face. When the beam reaches the edge of the tube face this pulse will abruptly cease; another pulse will occur when the beam sweeps across an intentional marking on the tube face. Still another pulse will be initiated when the sweep crosses the opposite edge of the tube face. The pulses produced by virtue of the sweep traveling beyond the confines of the tube face will, if incorporated into the video signal, give rise to spurious video signals which are indistinguishable from those produced by intentional markings. If, as is often the case, the sweep of the display tube, although synchronous with that of the mapping tube, is adjusted to display a portion of the complete presentation which includes and extends beyond the confines of the enlarged portion concurrently presented on the mapping tube, then the spurious video signals hereinbefore referred to will produce bright markings on the receiver tube face, which may cause considerable confusion. This confusion will become increasingly serious in proportion to the enlargement of the mapping tube presentation, since more and more of the sweep length will be occupied by the spurious pulse arising from that portion of the mapping tube sweep which extends beyond the confines of the mapping tube face, in the manner hereinbefore explained. This may obscure other important data contained in the video signal and which are also to be presented on the display tube face.

In the past, it has been attempted to overcome this defect by supplying a gating signal to the photoelectric cell confronting the mapping tube face, which rendered this cell sensitive to light variations only during the period when the beam was scanning the tube face. Unfortunately, the duration of such a gating signal is a function of the sweep length, the amount of off-centering of the mapping tube sweep and the instantaneous azimuthal position of the sweep trace. Because of the many variables involved, circuits for generating the required gating signals were prohibitively complex.

It should further be noted that a spurious pulse signal is generated, in prior art video mapping systems, not only when the mapping tube sweep extends beyond the confines of the tube face, but also when the sweep length is so adjusted that the sweep ends on the tube face. In that case, too, the response of the photoelectric cell to the sudden darkening of the screen at the end of the sweep is confusingly similar to the interruption of photoelectric cell illumination by an intentional opaque marking. This latter spurious signal, even the complicated prior art gating circuit was unable to eliminate.

It is a primary object of my invention to provide a video mapping system in which all spurious signals due to enlargement and/or off-centering of the mapping tube sweep are eliminated from the video signal derived therefrom prior to the combination of this video signal with other video signals to be supplied to the display tube of the system.

It is another object of the invention to provide a simple video mapping system in which spurious pulses are suppressed.

It is still another object of the invention to provide a video mapping system in which spurious signals are suppressed without interference with the normal generation of marking signals.

Still another object of the invention resides in the provision of a simplified video mapping system which produces substantially ideally shaped video pulses in response to desired markings on the face of the mapping tube only.

Broadly speaking, the aforedescribed spurious response of a video mapping system caused by magnification and/or off-centering of the mapping tube sweep was due to the fact that the transition between light and dark due to the beam leaving or entering the mapping tube face was indistinguishable from the transition due to the beam sweeping across a marking on the tube face. More particularly, transitions from both causes were substantially instantaneous and of substantially equal magnitude. Thus, the photoelectric cell which responded to these light variations was unable to distinguish between the transitions from these two causes. In accordance with my basic inventive concept, there are provided, in a system of video mapping constructed in accordance therewith, means for altering the characteristics of the illumination transition due to crossing of the tube edges by the sweep, so that a transition from that cause is clearly different and readily distinguishable from a transition due to traversal of an opaque marking intentionally placed on the mapping tube face. In particular, apparatus constructed in accordance with my invention is characterized in that the transition between light and dark due to the sweep crossing the edge of the tube face is gradual whereas the transition between light and dark due to the sweep traversing an intentional marking on the tube face remains abrupt, as heretofore. This arrangement is supplemented by electrical apparatus which is non-responsive to gradual transitions from light to dark but which is responsive to sudden transitions between these two extremes to produce a pulse signal of predetermined amplitude and of duration proportional to the width of the opaque marking which gives rise to the aforesaid abrupt transition, this width being measured in the direction of propagation of the sweep.

Figure 2:
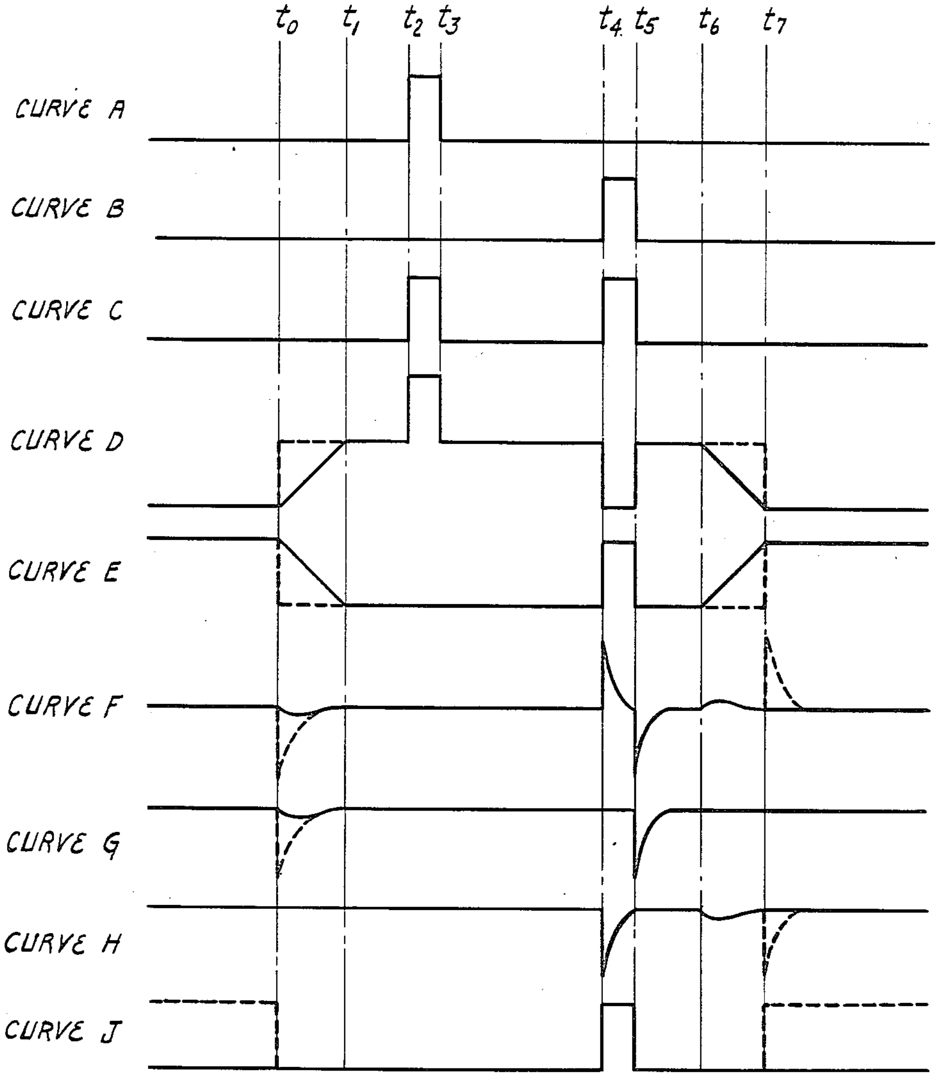
Figure 3:
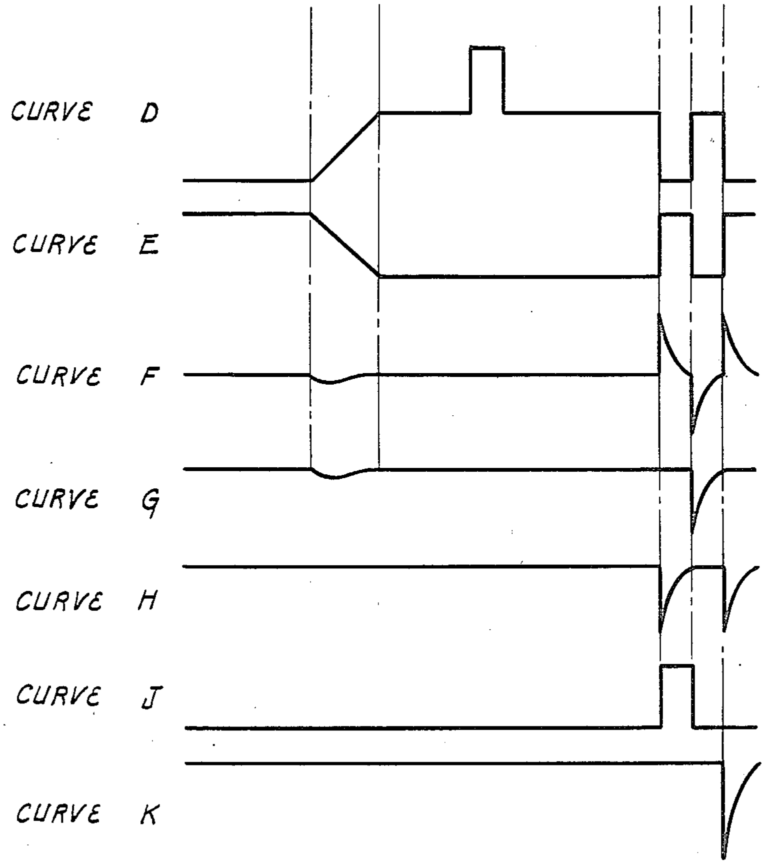

Since, as will be seen from the subsequent discussion, the arrangement hereinbefore briefly delineated is ineffective in guarding against spurious pulses due to the sweep ending within the confines of the mapping tube face, there are provided additional means for supplying a deactivating signal to the pulse producing apparatus so as to disable the latter momentarily at the end of each sweep. The manner in which the advantages of my invention are more particularly realized and its objects and features are achieved will become more clearly apparent from the subsequent discussion when considered in the light of the accompanying drawings wherein:

Figure 1 shows a preferred arrangement of a video mapping system constructed in accordance with my invention;

Figure 2 is explanatory of one common mode of operation of the system of Figure 1, showing the waveforms of signals at various designated points therein when the system is operated with the mapping tube sweep extending beyond the edge of the tube face; and Figure 3 is explanatory of a second mode of operation of the system of Figure 1, showing the waveforms of signals at the same designated points therein when the system is operated with the mapping tube sweep terminating on the tube face.

The complete video mapping system illustrated in Figure 1 of the drawings, to which more detailed reference may now be had, comprises a conventional radar receiver 10, whose output is connected to each of two cathode ray tubes 11 and 12, tube 11 being the mapping tube, while tube 12 is the display tube of the system. In accordance with usual practice, mapping tube 11 is equipped with a conventional electron gun 13 for directing a beam of electrons toward tube face 14. A control grid 15 is also provided for varying the intensity of the electron beam emanating from gun 13. A conventional rotating deflection coil 16 is provided surrounding the neck of the mapping tube, as is also a stationary off-centering coil 17. Display tube 12 is similarly equipped, being provided with its own electron gun 18, beam intensity control grid 19, rotating deflection coil 20 and stationary off-centering coil 21. A sweep generator 22 simultaneously supplies sawtooth deflection signals to both rotating deflection coils 16 and 20. These deflection coils are both rotated about the necks of their respective tubes in synchronism with the receiving antenna **10*a* of receiver 10, this rotation being imparted by conventional electromechanical linkages. These linkages are diagrammatically represented by broken lines interconnecting antenna 10*a* and drive pinions 16*a* and 20*a*, respectively engaging the crenelated outer periphery of deflection coil housings 16 and 20**.

The instantaneous deflection of each beam is then the result of the combined effect of rotation of its deflection coil and of the sawtooth signal supplied thereto, the latter determining the radial deflection, while the former determines the azimuthal deflection of each beam. In this manner the desired sweep pattern is synchronously produced on both tube faces.

A sweep length control circuit 23 is interconnected intermediate sweep generator 22 and the rotating deflection coil 16 of the mapping tube 11. This circuit may consist of a simple potentiometer control for adjusting the amplitude of the sawtooth signal supplied from the sweep generator to the deflection coil, thereby controlling the length of sweep of the mapping tube beam.

Off-centering coils 17 and 21, which act to superimpose a constant deflection upon the variable deflection due to the sawtooth signal from sweep generator 22, thereby producing effective off-centering of the sweep of each tube, are energized by separate centering control circuits, respectively designated by reference numerals 24 and 25. Each of these centering control circuits may comprise a suitable source of unidirectional potential, together with potentiometer controls which enable the operator to vary, within wide limits, the value of deflecting current supplied to the horizontal and vertical branches, respectively, of the stationary off-centering coils, thereby enabling the operator to effect the desired off-centering of each tube sweep. It will be understood that the particular deflection elements hereinabove described are entirely conventional and that various other arrangements are known which may be substituted therefor with equally satisfactory results.

For a detailed discussion of this and various other deflection arrangements known in the art, reference may be had to pages 532 through 545 of Radar System Engineering, which is volume 1 of the Massachusetts Institute of Technology Radiation Laboratory Series published 1947 by McGraw-Hill Book Company, New York.

The effect of varying adjustment of the sweep length control circuits 23 for a given setting of the centering control 24 is graphically illustrated in Figure 1 where point 26, to the left of tube face 14, represents a typical off-centered position of the sweep trace origin, while the arc of a circle made by broken line 27 indicates a portion of the locus of the sweep end points for one typical adjustment of the sweep length control circuits, while the arc of a circle traced by broken line 28 represents a portion of the locus of sweep end points for another typical adjustment of the sweep length control circuits. Broken line 29, which extends from a sweep origin 26 to sweep end locus 27 then represents a typical radial sweep trace of the mapping tube beam starting and ending off the tube face. Broken line 30, on the other hand, extends from sweep origin 25 to sweep end locus 28 and represents a typical sweep trace ending on the tube face.

The output of receiver 10 which is, as stated, simultaneously applied to both the mapping and display tubes, serves to vary the grid potential and, with it, the electron beam intensity in the well known conventional manner to produce indications of received signals by bright markings in corresponding positions on the two tube faces.

Further in the video mapping system constructed in accordance with the invention, a photoelectric cell 31 is disposed confronting the tube face 14 of mapping tube 11. An amplitude-limiting amplifier 32 receives the output of the photoelectric cell and supplies it, after certain modifications which are described in detail hereinafter, to differentiating network 33. The output of network 33 is, in turn, supplied to a pulse generating network 34, described in more detail hereinafter, by way of two separate paths, one of which includes positive pulse clipping network 35, while the other includes phase inverter 36 followed by positive pulse clipping network 37. The output of pulse generating network 34 is then applied to the conductor which supplies received signals to display tube 12. For reasons which appear hereinafter, a pulse forming network 38 is additionally provided interconnecting an output of sweep generator 22 and the output of positive pulse clipper 35.

In operation, the electron beam of mapping tube 11 is deflected in accordance with signals derived from sweep generator 22 and as modified by sweep length control 23 and centering control 24. The intensity of the beam is modified, as described, by signals supplied by receiver 10. Since the light emission of the fluorescent coating of tube face 14 is, in accordance with ordinary practice, proportional to beam intensity, the beam will trace a conventional radar presentation pattern on the tube face in which received signals appear as very bright markings on a background of intermediate brightness.

The fluorescent coating of mapping tube face 14 is preferably chosen so as to have a persistence of luminescence, after the excitation by the impinging electron beam has ceased, which is substantially shorter than the period of one sweep revolution, that being the time required for the deflection coil 16 to make one revolution. Thus, bright signal markings which appear during any given sweep traversal will have disappeared by the time the beam retraces that same sweep traversal, with the result that the illumination of the photoelectric cell corresponds more closely to the instantaneous brightness of the sweep trace.

This instantaneous brightness of the tube face, in response to excitation by the electron beam, is observed by photoelectric cell 31 which transforms it into an electrical output signal whose amplitude variations are proportional to the variations in instantaneous brightness of the tube face. If there be, for example, a region 39 on the mapping tube face which is considerably brighter during electron beam traversal thereof than the surrounding area of the tube face, due to a received signal in that location, then, during each such traversal of region 39, the output signal of photoelectric cell 31 will suddenly increase in amplitude, reverting again to its normal level when the beam has swept past region 39. If an opaque mark 40 be intentionally placed on another region of tube face 14 along the same sweep trace of the electron beam, then the illumination of the photoelectric cell by the tube face will abruptly decrease during passage of the beam across the region of the tube face which is masked by opaque mark 40, with the result that the output of photoelectric cell 31 will suddenly decrease considerably below its normal value and will be maintained at this low value for as long as the beam remains masked behind mask 40.

When the sweep length control 23 and the centering control 24 are adjusted, by the operator, so as to lengthen and off-center the mapping tube sweep, then the trace of the electron beam, as symbolized by trace 29, may also pass off the edge of the tube face altogether. As soon as this happens, light emission from the tube will, of course, cease, the photo-electric cell responding to this by decreasing its output signal to the low level which obtained while the trace was masked by opaque mark 40. Thus, in a single sweep traversal such as illustrated by broken line 29, the electron beam may start off the face of the tube, cross the edge of the tube onto its face, sweep across the tube face producing varying illumination of the photoelectric cell depending upon the intensity of received signals and on the presence of opaque marks along the trace of the beam, and then again pass off the face of the tube. The particular arrangement of bright and opaque marks 39 and 40 shown along sweep trace 29 is, of course, intended to be only typical of the operation of the system, it being well understood that any other arrangement of received signal display and mapping markings may obtain under different conditions.

With the particular disposition of sweep trace, received signal, and opaque marking hereinbefore described, the transitions observed by photoelectric cell 31 are from dark to bright when the trace enters the tube face, from bright to very bright and back to bright when the trace crosses region 39, from bright to dark and back to bright when the trace crosses marking 40 and finally back to dark once more as the trace leaves the tube face.

It is evident, from the preceding description of the fluctuations in illumination of the photoelectric cell, that entering or leaving of the tube face by the sweep trace produces the same effect upon the illumination of the photo cell as does passage of the trace across opaque marking 40. As has been briefly stated hereinbefore, the resultant confusing similarity in photoelectric cell response to the intentional marking 40 and to the crossing of the tube face edges is modified, in accordance with the invention, by making the transition between light and dark at the tube edges very much slower than the same transition at the opaque marking. This is accomplished, in the preferred embodiment of the invention, by interposing an annular mask 41 between the tube face and the photoelectric cell, this annular mask being so constructed that it is fully light transmissive at its inner edge, becoming gradually less and less light transmissive toward its outer edge until it is completely opaque at that outer edge. The size of this mask is preferably such that its outer and most opaque edge coincides with the outer edge of the tube face. One type of mask suitable for such application consists of an annular sheet of transparent plastic such as methyl methacrylate which has been smoked so as to give it the aforedescribed gradually varying light-transmissive characteristics. It will be understood, in this connection, that the use of a separate mask is discretionary, it being perfectly feasible to incorporate such an annular mask into the tube itself as, for example, by appropriately painting an annular portion of the tube face with paint shading outwardly from gray into black. In general, such a mask may assume any desired physical structure, provided only it possesses the aforedescribed light transmissive characteristics. By the same token, the opaque markings which are to be reproduced by my novel video mapping system need not be placed directly on the tube face, but may take any physical form provided only they intercept light emitted from those regions of the tube face on which the markings would appear.

Considering now the effect which the presence of a mask, constructed as hereinbefore described, has upon the illumination of photo cell 31 by the tube, it will be noted that, although the beam, upon entering the tube face, immediately changes the tube face from dark to bright, nevertheless most of the light emitted by the tube face is initially intercepted by mask 41, and only as the beam continues to sweep inward on the tube face along its trace 29, is more and more light transmitted through mask 41, thus gradualy increasing the illumination of photoelectric cell 31. The reverse process takes place at the opposite edge of the tube face where the brightness of the tube face itself remains undiminished until the beam actually crosses its outer edge whereas the illumination of the photoelectric cell begins to decrease much sooner, owing to the increasing interception of light by the graduated mask 41.

The operation of the remaining components of the system upon the electrical signals derived from photoelectric cell 31 in response to illumination of the cell from the mapping tube face in the manner hereinbefore described will be most readily understood with reference to Figure 2, where there are illustrated, by solid line curves, the waveforms of signals at important points along their paths through the system, under the aforedescribed conditions of operation. In addition, spurious waveforms which would arise at the same points in the system in the absence of graduated annular mask 41 have been indicated by broken line portions in the same curves. This was done in order to emphasize the essential contribution of the mask to the proper functioning of my system. All these curves have been drawn in vertical alignment so that the simultaneity of occurrence of signals at various points in the system is pointed up. In Figure 2, curve A represents the output of the radar receiver 10 during the sweep under consideration. It will be noted that this output starts at a predetermined low level, abruptly increases at a time $t_2$ corresponding to the initial instant of reception of a radar signal, and again decreases abruptly to its normal low value at a time $t_3$ which corresponds to the end of the received signal, this normal low value being maintained for the rest of the sweep period. The signal illustrated in curve A will give rise to a bright marking on the faces of both mapping tube and display tube, in corresponding positions along their respective sweep traces. In order to reproduce, on the display tube face, the opaque marking 40 which has been previously placed on tube face 14 further along the same sweep trace, it is necessary that, to the signal derived from receiver 10 and illustrated in curve A, there be added, before application to the beam intensity control grid 19 of the display tube, a signal similar to that shown in curve A, but having its positive pulse occurring during that portion of the sweep trace which corresponds to the interval in which the mapping tube sweep trace is masked by opaque marking 40. This signal, which it is desired to add to the received signal, is illustrated in curve B of Figure 2 where it is seen to consist of a signal of constant amplitude interrupted by a sharp positive pulse during a time interval $t_4$ to $t_5$ corresponding to the masking interval of the mapping tube sweep trace 29 by opaque marking 40. Curve C then illustrates the appearance of the desired combined signal which results from the additive combination of the signal derived from the receiver and the signal derived from the mapping tube and its associated video mapping circuits, and respectively represented in curves A and B. This signal is seen to comprise two positive pulses, one occurring during the interval $t_2$ to $t_3$ and corresponding to the received signal and the other one occurring during the interval $t_4$ to $t_5$ and corresponding to the masking interval of the mapping tube sweep trace. It is, accordingly, the task of the complete video mapping system illustrated in Figure 1 to produce a final output signal similar to that illustrated in curve B in response to an opaque marking such as shown at 40 in Figure 1.

How this system operates to provide such an output signal will now be described in detail and with reference to the remaining curves of Figure 2. Thus, curve D of Figure 2 represents the signal which will appear at the output of photoelectric cell 31 during the typical sweep trace 29 under consideration. This signal is seen to start at a low level which is maintained until a time $t_0$ corresponding to the initial crossing of the tube face edge by sweep trace 29. At that time, the output signal would, in the absence of graduated mask 41, rise abruptly to a higher level. This hypothetical transition is shown by the sharp broken line transition at $t_0$. However, due to the presence of graduated mask 41, the signal will not rise abruptly, since the illumination of the photoelectric cell by the tube face will not rise abruptly. Instead, the photoelectric cell illumination, and with it the photoelectric cell output signal, will gradually increase as shown by the inclined solid line extending to the right from $t_0$, until it reaches the aforesaid higher level at a time $t_1$ corresponding to the point along sweep trace 29 at which this trace emerges from behind mask 41. An additional positive output pulse will occur during the interval $t_2$ to $t_3$ corresponding to passage of the sweep trace across received signal region 39, while a corresponding negative pulse will occur during the interval $t_4$ to $t_5$ corresponding to masking of the sweep trace, and consequently of the photoelectric cell illumination, by opaque marking 40. Again in the absence of annular mask 41, the output signal of photoelectric cell 31 would suddenly return to its initial value at a time $t_7$ corresponding to passage of the sweep trace off the tube face, as illustrated by the abrupt broken line transition at $t_7$ in curve D. However, the presence of mask 41 prevents this sudden decrease and, instead, the output signal of the photoelectric cell gradually decreases to its final low value during a substantial time interval extending from $t_6$ to $t_7$ and corresponding to the time required for the sweep trace to pass outwardly behind mask 41. Thus, it is seen that the principal effect of the presence of graduated mask 41 is to smooth out the otherwise abrupt transitions in the photoelectric cell output signal occurring at the intersections of the sweep trace and the mapping tube face edges. The important beneficial effects of this smoothing will be apparent from the following analysis.

Since the positive pulse due to the received signal displayed on the mapping tube face may produce a spurious response in the remainder of the video mapping system, it is desirable that this pulse be eliminated from the output signal of the photoelectric cell before further processing. Fortunately, this is readily accomplished by feeding this output signal to limiting amplifier 32, which is adjusted so as to overload at the signal level corresponding to normal illumination of the mapping tube face in the absence of received signals. Since the pulse due to the opaque marking on the tube face is of opposite polarity to that due to received signal, this pulse will be transmitted by the limiting amplifier without difficulty. A signal limiting amplifier suitable for this application may be any one of several types well known in the art and is, accordingly, represented in Figure 1 only by an appropriately designated box 32.

Curve E of Figure 2 illustrates the waveform of the signal at the output of limiting amplifier 32 in which, it will be noted, the polarities of signals pictured are reversed from what they were in curve D, this reversal being due to the normal phase reversal which accompanies passage through an amplifier having an odd number of stages. It will be noted, that the waveform shown in curve E differs from that shown in curve D principally in that the pulse corresponding to increased brightness of the tube face due to appearance of a received signal thereon has been eliminated by virtue of the signal limiting characteristics of the amplifier hereinbefore described. Thus, only one pulse remains in the output signal of the limiting amplifier, this one occurring during the time interval $t_4$ to $t_5$ and, accordingly, corresponding to masking of the mapping tube sweep trace by opaque marking 40. In curve E, as before, the solid lines of the curve indicate the actual appearance of the signal, the broken line portions indicating what the signal would be in the absence of graduated mask 41. It is seen that, here again, the principal effect of the presence of the mask is to smooth out the signal level transitions corresponding to intersections of the sweep trace and the mapping tube face edges.

As shown in Fig. 1 of the drawings, the output of limiting amplifier 32 is supplied to differentiating network 33, where the signal undergoes a transformation illustrated by curve F of Figure 2. Inspection of the solid line portions of this curve shows that the gradual negative-going transition of curve F due to entry of the mapping tube sweep trace upon the tube face past mask 41 is degenerated into a slight negative excursion of the output voltage of the differentiating network which occupies the same relative time interval $t_0$ to $t_1$. Similarly, the gradual rise in the output signal of the limiting amplifier, which corresponds to passage of the sweep trace off the tube face behind mask 41, has been degenerated, by the differentiating network, into a slight positive voltage excursion extending from $t_6$ to $t_7$. The leading edge of the output pulse of the limiting amplifier, on the other hand, has been transformed into a positive spike signal of considerable amplitude occurring at $t_4$, while its trailing edge has been transformed into a negative spike signal of similar amplitude occurring at $t_5$. The different treatment accorded by the differentiating network to the gradual and abrupt transitions in the signal supplied thereto is, of course, well understood, being one of the inherent characteristics of differentiating networks whose operation is so well understood generally as not to require detailed description here.

Once again, the broken line portions of the curve indicate the hypothetical operation of this stage of the system in the absence of annular mask 41. Thus, the abrupt broken line transitions indicated at $t_0$ and $t_7$ in curve E would be transformed, by the differentiating network, into corresponding spike signals at $t_0$ and $t_7$, with the result that two undesired spike signals would appear in the output of the differentiating network in addition to the two desired ones a $t_4$ and $t_5$.

Thus it is seen that the signal changes resulting from the presence of mask 41 enable differentiating network 33 to respond differently to signal transitions due to different causes. As a result, the voltage variations in the output of the photoelectric cell, which were, heretofore, all of equal amplitude irrespective of their origin, have now acquired different amplitudes, the amplitude of the gradual transitions having been rendered negligible compared to that of the abrupt transitions taking place in response to the intentional marking. Signals derived from differentiating network 33 and having the waveform of curve F of Figure 2 are now simultaneously applied to positive pulse clippers 35 and 37, the signal applied to clipper 37 having first had its polarity reversed in phase inverter 36 so that positive voltage excursions of the output signal of differentiating network 33 have become corresponding negative voltage excursions by the time they are supplied to positive pulse clipper 37, while negative voltage excursions in the output signal of the differentiating network have been transformed into equivalent positive voltage excursions prior to their application to pulse clipper 37. Phase inverters and pulse clippers which operate in the manner herein described are well known in the art and do not require detailed discussion of their circuitry. Each of positive pulse clippers 35 and 37 operates on the signal applied thereto to remove all positive voltage excursions therefrom, while transmitting negative volage excursions without substantial alteration. Thus, the output of positive pulse clipper 35 will have the waveform illustrated by solid-line curve G of Figure 2 which is characterized by a slight negative excursion during interval $t_0$ to $t_1$, corresponding to the simultaneous slight negative excursion of the signal shown in curve F, and a negative spike signal at $t_5$ corresponding to the negative spike signal of course F and, consequently, to the end of the interval during which the sweep trace on the mapping tube face is masked by the opaque marking 40. The output of positive pulse clipper 35, on the other hand, is illustrated by solid-line curve H of Figure 2 and is observed to exhibit a slight negative voltage excursion during the interval $t_6$ to $t_7$ corresponding to the simultaneous slight positive voltage excursion in the output of the differentiating network 33 illustrated in curve F of Figure 2, as well as a negative spike signal of considerable amplitude at $t_4$ corresponding to the positive spike signal of the waveform of curve F and, consequently, to the beginning of the period during which the sweep trace on the mapping tube face is masked by opaque marking 40.

It will be noted that the spurious spike signals shown in the output of differentiating network 33 at $t_0$ and $t_7$, which would occur in the absence of mask 41, would not be eliminated by positive pulse clippers 35 or 37. Under this hypothetical condition of operation, the spike at $t_0$ would appear in the output of clipper 35 and the spike at $t_7$ in the output of clipper 37, as indicated by broken line spike signals in their respective output waveforms.

The signals derived from the two pulse clippers 35 and 37, and illustrated in curves G and H of Figure 2 are thence supplied, respectively, to the two input terminals 42 and 43 of pulse generator 34. This pulse generator is characterized in that a spike signal of predetermined polarity applied to one of its input terminals will initiate an output pulse, while a spike signal of the same polarity applied to its other input terminal will terminate this output pulse. The particular pulse generator illustrated is commonly known as an Eccles-Jordan trigger circuit and is so well known in the art as not to require detailed description here. Suffice it to say that this pulse generator comprises a pair of triode vacuum tubes 44 and 45 as its principal active constituents, the control grid of triode 44 being connected, via a suitable coupling condenser 36, to input terminal 42, whereas the control grid of triode 45 is connected, also via a suitable coupling condenser 37, to input terminal 43. The anode of triode 45 is in the output circuit of the pulse generator and is, accordingly, connected to its output terminal 48. The grid bias voltage $C^-$ supplied to both triodes is chosen of sufficient magnitude to maintain either one of the tubes in conduction once it has been rendered conductive, for example, in response to a positive impulse applied to its grid. The effect of a negative spike signal, such as is derived at $t_4$ from positive pulse clipper 37 and supplied to the pulse generator via terminal 43, is to bias the control grid of triode 45 below cut-off, with the result that the feedback path from triode 45 to the control grid of triode 44 transmits a positive signal to the latter which is effective to bring the latter triode into conduction. This conducting condition of triode 44 is stable and will be maintained until a negative spike signal derived at $t_5$ from positive pulse clipper 35 is supplied to its control grid by way of input terminal 42 and capacitor 46, at which time the grid of triode 44 will be biased below cut-off, conduction of the triode will cease and a signal will be fed back to the control grid of triode 45 which will render the latter conductive and cut off triode 44. Since this latter condition of the circuit is also stable, it will be maintained until the next successive negative spike signal is supplied to input terminal 43 from positive pulse clipper 37. Thus, only signals which are alternately supplied to input terminals 42 and 43 will be effective in changing the condition of the output tube of the pulse generator from off to on or vice versa. Consequently, if a negative spike signal applied to input terminal 42 is succeeded by another negative spike signal applied to the same terminal, without a negative spike signal having been applied to terminal 43 in the intervening period, then the latter negative spike signal will have no further effect on the condition of the pulse generator, whose output tube will remain in its conducting condition. The grid bias of the triodes is, incidentally, chosen of such a value that signals of lower amplitude than the spike signals derived from pulse clippers 35 and 37 are ineffective to alter the condition of the pulse generator. Thus, the small negative voltage excursions shown in curves G and H during intervals $t_0$ to $t_1$ and $t_6$ to $t_7$, respectively, will be ignored by the pulse generator 34. Since the plate voltage of a triode is low when the triode is conducting and high when it is non-conducting, the output voltage of the pulse generator, as measured at output terminal 48, which, as explained, corresponds to the plate voltage of the triode 45, will be low until a negative spike signal derived from positive pulse clipper 37 reaches input terminal 43 and cuts off triode 45. At that time the output voltage will instantaneously rise and, since the pulse generator is now in its other stable condition, with tube 44 conducting and tube 45 non-conducting, this increased output voltage will be maintained until a negative spike signal derived from positive pulse clipper 35 is supplied to input terminal 42, at which time the original condition of low output voltage will be restored. As hereinbefore explained, spike signals derived from pulse clipper 37 at $t_4$ correspond to the initial instant of masking of the mapping tube sweep trace by an opaque marking intentionally placed thereon, while spike signals derived from pulse clipper 35 at $t_5$ correspond to the final instant of such masking. Accordingly, output tube 45 of pulse generator 34 will be non-conducting while the mapping tube sweep trace traverses an intentional opaque marking on the mapping tube face, with the result that a positive output pulse will appear at output terminal 48 of the pulse generator, this output pulse having the general waveform, timing and duration shown by solid line curve J of Figure 2, where it is seen to correspond, with a high degree of accuracy, to the pulse signal of curve B of Figure 2 which has previously been shown to constitute the ideal output signal of the complete mapping system. This pulse is, accordingly, suitable for direct application to control grid 19 of display tube 12, on whose tube face it will produce the desired bright indication corresponding to the opaque marking on the mapping tube face.

Referring now, once again, to the hypothetical mode of operation of the system in the absence of annular mask 41, it will be noted that, in that case, spurious spike signal shown at $t_7$ in curve H would trigger the pulse generator 34, thereby initiating a spurious output pulse indicated, in curve J, by the broken line pulse beginning at $t_7$. Emission of this pulse from the pulse generator would continue until the spurious spike signal shown at $t_0$ in curve G occurred, which would turn off the pulse generator. Thus, the omission of annular mask 41 would result in the emission from pulse generator 34 of the spurious positive output pulse illustrated in broken lines in curve J which, in turn, would be applied to the control grid 19 of display tube 12 where it would produce a bright indication, of duration corresponding to that of the spurious pulse and which would not correspond to any desired signal or marking on either tube face. It will be noted that the duration of this spurious signal may easily be many times longer than that of the desired pulse signal occurring in the interval $t_4$ to $t_5$. Accordingly such spurious pulse signals are well able to obscure other important information appearing on the face of display tube 12, thus emphasizing the importance of eliminating this spurious pulse response in accordance with the provisions of my novel video mapping system.

Where the mapping tube sweep length is always such that the sweep ends off the mapping tube face, the system is complete, as heretofore described. In order to render the system more versatile, however, it must be possible to adjust the sweep control circuits so as to cause the mapping tube sweep to end on the tube face. This condition is diagrammatically illustrated in Figure 1 by sweep trace 30 which may be considered as representative of a typical sweep trace originating to the left of the tube face, crossing onto the tube face at its left-hand edge, traversing regions 39 and 40 in succession and terminating at sweep end locus 28, still on the tube face. The illumination of the mapping tube face will, therefore, be zero from the beginning of the sweep trace until it crosses the edge of the tube face. It will then gradually increase as the sweep trace progresses inwardly behind graduated annular mask 41, until it reaches its condition of normal brightness at the inner edge thereof. This brightness suddenly increases sharply during traversal of region 39, while falling to zero during masking by opaque marking 40. The tube illumination then again decreases abruptly to zero at locus 28 which corresponds to the end of the sweep trace. It will be seen that, in the case under consideration, the light-to-dark transition in photoelectric cell illumination due to the ending of the sweep will be abrupt, and, consequently, indistinguishable from the light-to-dark transition due to masking of the tube face by opaque marking 40. In this case, however, the presence of graduated annular mask 41 is ineffective to modify the abrupt character of the light-to-dark transition due to the sweep end, so that, unless special precautions are taken, a spurious output signal from pulse generator 34 may result from this abrupt transition which, in turn, produces a spurious indication on display tube 12.

It is to provide for this particular contingency, that pulse former 49 has been specifically provided. For reasons which will be apparent from the subsequent discussion, this pulse former is so arranged as to be responsive to the end of each radial sweep of the mapping tube beam, as determined by the output of sweep generator 22, to form a negative spike signal similar to the negative spike signal derived from pulse clipper 35 and preferably of greater amplitude than the latter. The waveform of this output signal from pulse former 49 is shown in curve K of Figure 3, to which more detailed reference may now be had. Figure 3 is illustrative of the waveforms of signals at points D through K in the system of Figure 1 under the changed operating conditions hereinbefore described, namely with the mapping tube sweep trace terminating on the tube face. Specifically, consideration of curves D, E and F of Figure 3, which are representative of the waveforms of signals at points D, E and F in the circuit of Figure 1, will show that the output of differentiating network 33, illustrated in curve F, now contains not only the two spike signals of opposite polarity which were present when the sweep trace of the mapping tube did not terminate on the tube face but also a third spike signal, of amplitude substantially equal to the other two and of polarity such that it will appear as a negative spike signal at point H, this being input terminal 43 of pulse generator 34. As seen from curves G and H of Figure 3, this additional negative spike signal, which is due to the abrupt illumination transition at the termination of the sweep trace on the mapping tube face, follows a negative spike signal applied to input terminal 42 from positive pulse clipper 35 and is, consequently, able to alter the condition of pulse generator output tube 45. Since the last preceding negative spike was applied to input terminal 42, output tube 45 is conductive prior to application of the additional spike signal to input terminal 43 and the latter will have the effect of biasing the output tube to cut-off, thereby increasing its plate voltage and producing a spurious positive output pulse at pulse generator output terminal 48. It is to counteract the effect of this additional negative spike signal, generated in response to sweep termination on the mapping tube face, that a signal is provided having the waveform illustrated in curve K of Figure 3 and derived from pulse former 49 as hereinbefore described. Since this negative spike signal is applied to input terminal 42 at the same time as the negative spike signal from pulse clipper 37 is applied to input terminal 43 and since, as hereinbefore explained, its amplitude is at least as great as that of the latter, it will nullify the tendency of the latter to alter the condition of the pulse generator so that the aforedescribed spurious positive output pulse will not be produced. Thus, the output waveform shown in curve J of Figure 3 remains free of any spurious signal.

It will be noted that, although pulse former 49 is specifically provided to counteract the tendency of pulse generator 34 to produce a spurious pulse in response to termination of the mapping tube sweep on the tube face, its presence will in no way interfere with the normal operation of the system for the case where the mapping tube sweep does not terminate on the tube face. This is due to the fact that the last preceding pulse applied to the pulse generator will have been a negative spike signal derived from pulse clipper 35 and applied to input terminal 42 so that, in the absence of any pulse to be counteracted, the output pulse derived from pulse former 49 will be applied to the same input terminal as the last preceding pulse and will, as hereinbefore explained, have no further effect upon the condition of the pulse generator. Thus, pulse former 49 may be permanently connected in the system without ill effects upon any of its various modes of operation.

It will be understood, of course, that the video mapping system hereinbefore described in detail constitutes only the preferred embodiment of my invention. Thus, for example, the various individual components of the system such as the limiting amplifier, the differentiating network, and so forth, may take a variety of specific forms as hereinbefore indicated. In addition, my novel video mapping system is not limited, in its applicability, to use with a single display tube, since any number of display tubes may be supplied with the output signal of my system, provided only that their sweeps are all synchronized as hereinbefore explained. Nor is it strictly necessary that the system be operated in conjunction with a radar receiver, since the information transferred by means of the video mapping system may itself be of sufficient importance to warrant the use of such a system. Accordingly, I desire the scope of my inventive concept to be limited only by the appended claims.

I claim:

1. A video mapping system comprising: a cathode ray tube having a fluorescent screen, an electron gun for projecting a beam of electrons toward said screen, and means for deflecting said beam to produce a scanning pattern which includes at least a portion of said screen; a photoelectric device responsive to illumination by said screen to produce a signal which varies instantaneously as a function of said illumination, said signal being subject to abrupt changes due to abrupt transitions in said illumination caused by the interposition of opacities between said screen and said photoelectric device and by inception or discontinuation of screen traversal by said beam; means for eliminating, from said signal, abrupt changes due to said inception or discontinuation of screen traversal by the electron beam, said last-named means comprising an element of varying light transmissivity disposed intermediate said screen and said photoelectric device, said element being of low light transmissivity for light illuminating said device from points on said screen immediately adjacent the edge thereof, and being of greater light transmissivity for light illuminating said device from points displaced from said edge; means selectively responsive to a supplied signal to transmit only abrupt changes therein; and means for supplying said signal from said photoelectric device to said selectively responsive means.

2. In a video mapping system comprising: a fluorescent screen, a source of an electron beam, means for deflecting said beam in accordance with a pattern such that at times it traverses at least a portion of said screen and such that at other times it traverses a region outside the limits of said screen, a photoelectric device responsive to illumination of said screen to produce a signal which varies as a function of said illumination, the output of said device being subject to abrupt changes by the introduction of opacities in the path of light traveling from said screen to said device and being subject to abrupt changes in response to the inception or discontinuation of traversal of said screen by said beam, means responsive to the output from said photoelectric device for producing a signal which varies in response to said abrupt changes in the output from said device, said last-named means comprising means for differentiating the output from said device to yield sharp pulses in response to said abrupt changes and which differ in polarity depending upon the sense of said changes, and a pulse generator responsive to said sharp pulses of one polarity to initiate the generation of pulses, and responsive to said sharp pulses of opposite polarity to terminate the generation of said pulses; the combination therewith of means for eliminating, from said signal which varies in response to said abrupt changes in the output from said device, variations produced by the inception or discontinuation of traversal of said screen by said beam, said means comprising an element of varying light transmissivity disposed in the path of light traveling to said photoelectric device from regions of said screen proximate the boundary thereof, said element being of low light transmissivity for light traveling to said device from points on said screen immediately adjacent said boundary and being of greater light transmissivity for light traveling to said device from points substantially displaced from said boundary.

3. A video mapping system comprising: a cathode ray tube having a fluorescent screen, a source of an electron beam, and deflection means for producing cyclically recurrent sweeps of said beam during some of which it traverses at least a portion of said screen; a photoelectric cell responsive to illumination of said screen to produce a signal which varies as a function of said illumination, the output of said device being subject to abrupt changes due to the introduction of opacities in the path of light traveling from said screen to said device and being subject to abrupt changes in response to the inception or discontinuation of traversal of said screen by said beam as well as by ending of the sweep of said beam on a portion of said screen; means responsive to the output from said photoelectric device for producing a signal which varies in response to said abrupt changes in the output from said device; means for eliminating, from said last-named signal, variations produced by the inception or discontinuation of traversal of said screen by said beam, said means comprising an element of varying light transmissivity disposed in the path of light traveling to said photoelectric device from regions of said screen proximate the boundary thereof, said element being of low light transmissivity for light traveling to said device from points on said screen immediately adjacent said boundary and being of increasing light transmissivity for light traveling to said device from points increasingly displaced from said boundary, said means responsive to the output from said photoelectric device comprising means for differentiating the output from said device to yield sharp pulses in response to said abrupt changes only and which differ in polarity depending upon the sense of said changes, a pulse generator responsive to said sharp pulses of one polarity to initiate the generation of pulses and responsive to said sharp pulses of opposite polarity to terminate the generation of said pulses; and additional means for counteracting variations in the output signal of said photoelectric device produced by ending of the electron beam sweep on a portion of said screen, said additional means comprising an auxiliary pulse former for producing a sharp pulse at the end of each said sweep, and means for applying said auxiliary pulse to said pulse generator with said opposite polarity to disable said pulse generator from initiating pules at the end of said sweep.

4. A video mapping system comprising: a cathode ray tube having a fluorescent screen, an electron gun for projecting a beam of electrons toward said screen, and means for deflecting said beam to produce a scanning pattern which includes at least a portion of said screen, a photoelectric device responsive to illumination by said screen to produce a signal which varies instantaneously as a function of said illumination, said signal being subject to abrupt changes due to abrupt transitions in said illumination caused by the interposition of opacities between said screen and said photoelectric device and by the inception or discontinuation of screen traversal by said beam; means for eliminating, from said signal, abrupt changes due to said inception or discontinuation of screen traversal by the electron beam, said last-named means comprising an element of varying light transmissivity disposed intermediate said screen and said photoelectric device, said element being of low light transmissivity for light illuminating said device from points on said screen immediately adjacent the edge thereof, and being of greater light transmissivity for light illuminating said device from points displaced from said edge; means selectively actuatable by abrupt changes only in a supplied signal to produce electrical signal variations; and means for supplying said signal produced by said device to said selectively actuatable means.

References Cited in the file of this patent

UNITED STATES PATENTS

| | | |
|---|---|---|
| 254,845 | Seaver, Jr. | Mar. 14, 1882 |
| 262,001 | Champlin | Aug. 1, 1882 |
| 2,096,985 | Von Ardenne | Oct. 26, 1937 |
| 2,113,214 | Luck | Apr. 5, 1938 |
| 2,193,869 | Goldsmith | Mar. 19, 1940 |
| 2,199,066 | Bernstein | Apr. 30, 1940 |
| 2,301,374 | Cox | Nov. 10, 1942 |
| 2,406,751 | Emerson | Sept. 3, 1946 |
| 2,468,714 | Leverenz | Apr. 26, 1949 |
| 2,525,156 | Tink | Oct. 10, 1950 |
| 2,540,943 | Hales | Feb. 6, 1951 |

FOREIGN PATENTS

| | | |
|---|---|---|
| 614,595 | Great Britain | Dec. 17, 1948 |